United States Patent [19]

Carlton

[11] Patent Number: 5,048,389
[45] Date of Patent: Sep. 17, 1991

[54] CIRCULAR SAW BLADE WITH SAW CHAIN PROVIDING CUTTERS

[76] Inventor: Raymond R. Carlton, 3105 SE. Carlton St., Portland, Oreg. 97202

[21] Appl. No.: 281,949

[22] Filed: Dec. 9, 1988

Related U.S. Application Data

[63] Continuation-in-part of Ser. No. 149,398, Jan. 28, 1988, abandoned.

[51] Int. Cl.⁵ .............................................. B27B 17/00
[52] U.S. Cl. ........................................ 83/838; 83/830; 83/835
[58] Field of Search ................... 83/830, 831, 832, 833, 83/834, 835, 838, 839, 853, 840, 841; 30/347, 383, 384, 385

[56] References Cited

U.S. PATENT DOCUMENTS

| | | | |
|---|---|---|---|
| 2,387,064 | 10/1945 | Forrest | 83/832 |
| 2,958,348 | 11/1960 | Bueneman | 83/838 |
| 4,414,676 | 11/1983 | Loigerot | 83/830 |
| 4,625,781 | 12/1986 | Miller et al. | 83/788 |
| 4,627,322 | 12/1986 | Hayhurst, Jr. | 83/831 |
| 4,744,148 | 5/1988 | Brown | 83/839 |
| 4,756,221 | 7/1988 | Nitschmann et al. | 83/833 |

FOREIGN PATENT DOCUMENTS 932037  3/1948  France .

OTHER PUBLICATIONS

Brochure Sheet of Sabre Tooth Blade.
Brochure Sheet of Big Pines Timber Blade.

Primary Examiner—Frank T. Yost
Assistant Examiner—Rinaldi Rada
Attorney, Agent, or Firm—Kolisch, Hartwell, Dickinson, McCormack & Heuser

[57] ABSTRACT

The invention includes a cutting chain having links therein, including anchor links and cutter links. Each anchor link has an anchor portion which extends to one side of the chain. Opposed side links join the anchor links. Certain of the side links are cutter links. A disc having alternating sprocket teeth and gullies extending about the periphery thereof is provided. The chain is secured about the perphery of the disc with the anchor portions received in the gullies. Side links in the chain straddle the sprocket teeth and serve to hold the chain from lateral displacement on the disc.

8 Claims, 3 Drawing Sheets

CIRCULAR SAW BLADE WITH SAW CHAIN PROVIDING CUTTERS

This application is a continuation-in-part of prior filed application Ser. No. 07/149,398, filed Jan. 28, 1988, now abandoned.

BACKGROUND AND SUMMARY OF THE INVENTION

The instant invention relates to circular cutting blades, and particularly to a circular cutting blade which utilizes a chain having cutter links therein serving as cutters in the blade.

Circular saw blades of the type disclosed herein are used in connection with hand-held power saws and also with brush or light timber harvesting equipment. The blade is mounted on a motor driven arbor which is rotated at relatively high speed to cause the blade to cut material, generally wood.

A number of circular saw blade assemblies utilizing chain-type cutters are known. One such blade is disclosed in U.S. Pat. No. 4,627,322 to Hayhurst, Jr., which utilizes a pair of discs which sandwich a portion of a saw chain about the periphery of the disc. Other blades utilize a circular disc having chain-saw type cutter links mounted about the periphery thereof, as by rivets or other fasteners securing the links to the disc.

Although the above-described blades are useful for their intended purposes, each blade encounters difficulties when used in extremely heavy brush or on hard materials. In the case of the first described blade, the chain portion is free to rotate about the disc, as there is no provision to engage the driving or anchor links on the saw chain. As the chain stretches during use, slippage increases as the chain is driven by the disc. In the case of units with chain-saw type cutters installed on a disc, the cutting teeth must be individually removed and replaced in the event that one of them becomes damaged, as is frequently the case when the blade is used as a brush cutter wherein it engages rocks rather than brush.

The invention of the application includes a cutting chain having links therein, including anchor links and cutter links. Each anchor link has an anchor portion which extends to one side of the chain. Opposed side links join the anchor links. Certain of the side links are cutter links. A disc having alternating sprocket teeth and gullies extending about the periphery thereof is provided The chain is secured about the periphery of the disc with the anchor portions received in the gullies. Side links in the chain straddle the sprocket teeth and serve to hold the chain from lateral displacement on the disc.

An object of the invention is to provide a cutting blade wherein anchor portions of a cutting chain are positively engaged by the disc on which the cutting chain is carried. More specifically, these anchor portions seat within gullies provided in the disc.

Another object is to provide such a cutting blade where side links in a cutting chain straddle sprocket teeth in the disc mounting the chain.

Another object of the invention is to provide a cutting blade wherein the cutting chain may be easily removed and replaced.

A further object of the invention is to provide a cutting blade wherein the cutting chain is carried on a single disc.

Yet another object of the invention is to provide a cutting blade which is easy to use, economical to manufacture and is durable.

These and other objects and advantages of the invention will become more fully apparent as the description which follows is read in conjunction with the drawings.

DETAILED DESCRIPTION OF THE PREFERRED EMBODIMENTS

Figure 2:
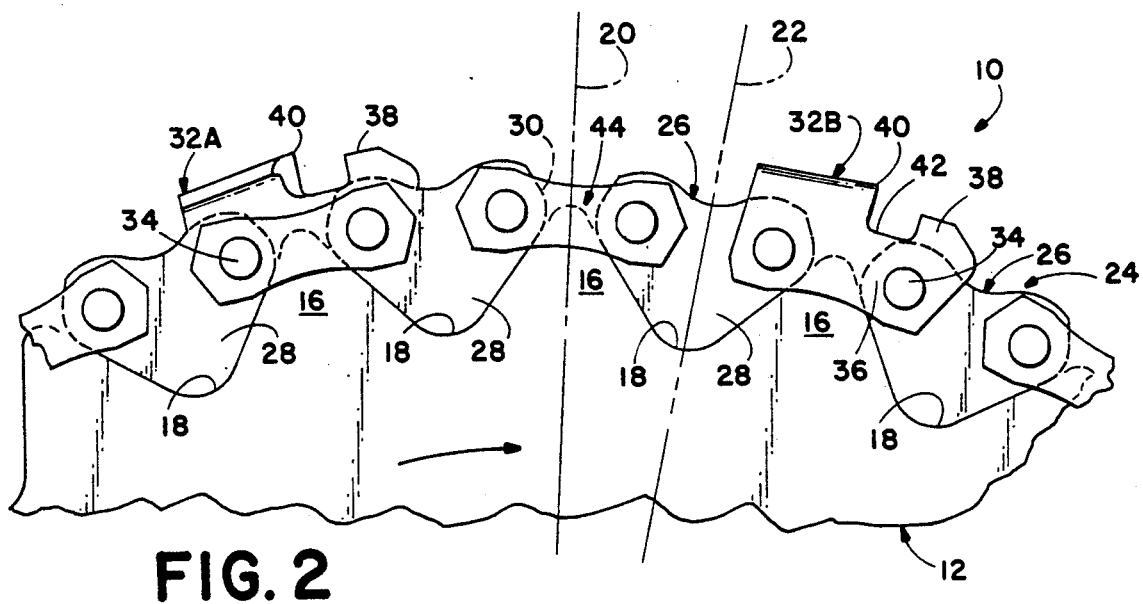
FIG. 2 is an enlarged view of a portion of the cutting blade of FIG. 1.
Figure 1:
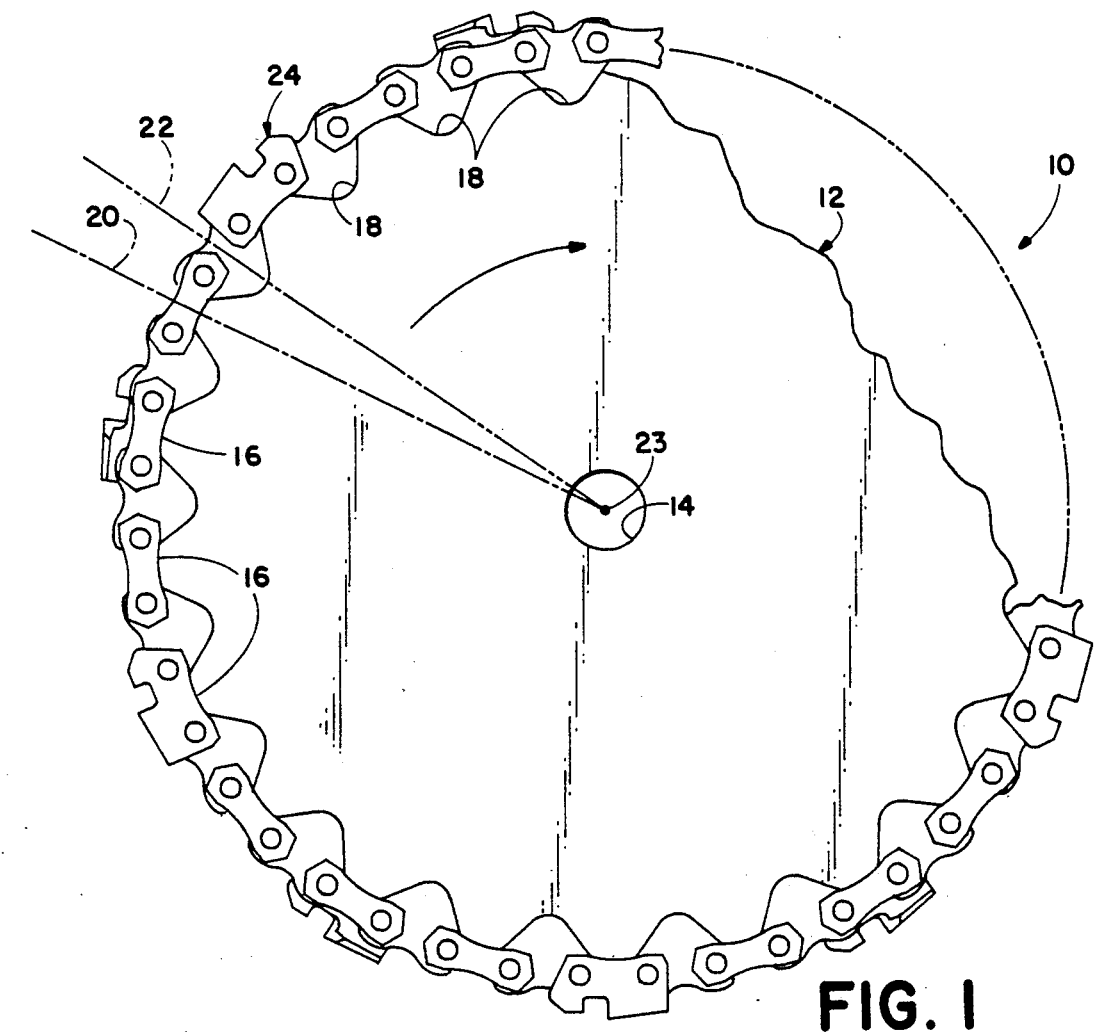
FIG. 1 is a partial plan view of a cutting blade constructed according to the invention.
Figure 3:
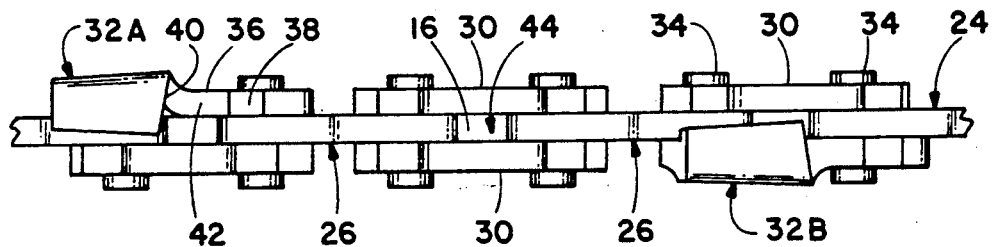
FIG. 3 is an enlarged view of an edge of the blade, shown in FIG. 1.

Turning now to the drawings, and initially to FIGS. 1-3, a cutting blade constructed according to the invention is shown generally at 10. Blade 10 includes a disc 12 which has a generally circular outline, and which has an arbor receiving bore 14 located at the center thereof. Bore 14 is operable to receive a motor-driven arbor therein which secures disc 12 to a power unit which is operable to drive the disc.

Disc 12 has an arrangement of alternating sprocket teeth and gullies arranged about the periphery thereof. The sprocket teeth are shown at 16, and the gullies are shown at 18. In the preferred embodiment, teeth 16 and gullies 18 are symmetrical about lines 20, 22, respectively, which extend outwardly from the center 23 of the disc. Disc 12 is formed of a single sheet of material, such as steel, and is therefore easy to manufacture and of relatively light weight.

A cutting chain 24 is disposed about the periphery of disc 12. Chain 24 is formed of a series of links which are joined together by pins, in the manner of well-known saw chains. Thus, chain 24 includes center, or anchor, links 26 with anchor portions 28 extending downwardly in the links. Interconnecting the center links are opposed side links 30, certain of these side links being cutter links such as shown in 32A and 32B. Interconnecting sets of side links with the center links are pins 34 extending through accommodating bores made in the links.

The cutter links may be similar to cutter links found in conventional saw chain and include, as shown by link 32B in FIG. 2, a body portion 36 from which projects at the forward part thereof a depth gauge 38 and from which projects at the rear part thereof a cutting tooth or cutter 40. The cutter and depth gauge are separated by a gullet 42. The cutter links include left and right hand cutter links interspersed with each other extending along the links of the chain, exemplified by left-hand cutter link 32A which is present on the left side of the chain facing the direction of the chains cutting action and right-hand cutter link 32B which is on the right side of the chain facing the cutting action of the chain.

The cutting chain, it will be noted, is mounted on and extends as a continuous chain circumferentially about the periphery of disc 12. The chain may be dismounted from disc 12 by removing a pin 34. A new chain may be mounted by extending the disc and securing the free ends with an appropriate pin.

If desired, a chain having an anti-kickback construction may be employed such as the saw chain described in U.S. Pat. No. 4,425,830. Whatever the type of chain employed, the chain after installation on the disc the chain becomes in effect a unified part of the entire cutting blade assembly.

In the chain and between successive center links is an open space 44. This space is bounded on opposite sides by the opposed side links which join the two center links. With the chain mounted in place, sprocket teeth 16 extend into these open spaces and each pair of opposed side links become positioned with such straddling a sprocket tooth. Anchor portions 28 become seated within gullies 18 of disc 12. In this way there is a positive driving engagement between the disc and chain. The side links by straddling the sprocket teeth serve to hold the chain from lateral displacement on the disc. With this organization, a disc in the form of a single plate may be used to support and propel the chain during the cutting operation. The provision of only a single plate as a disc provides an extremely lightweight cutting blade.

Referring now specifically to FIG. 3, it may be seen that cutting tooth 40 of link 32A extends to one side of disc 12 well beyond the thickness of the disc. The cutting tooth of the link of the opposite hand, link 32B, extends a like distance to the other side of the disc. This arrangement provides that chain 24 makes a cut having a kerf significantly thicker than the thickness of disc 12, thereby allowing free passage of the disc through the cut material.

Figure 4:
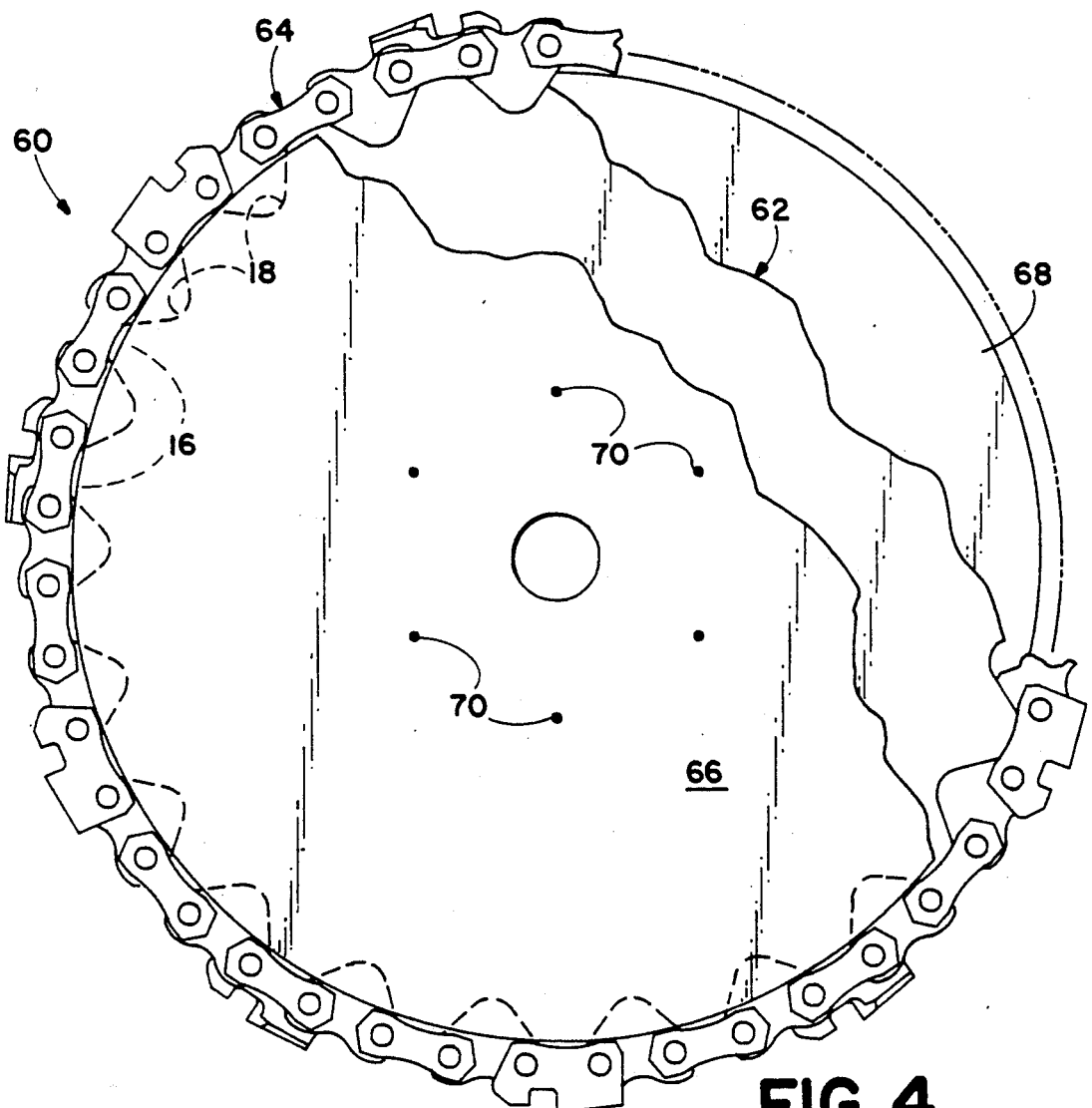
FIG. 4 is a partial plan view of a modified form of the cutting blade, with portions broken away.

In a second embodiment of the invention, depicted in FIG. 4, a cutting blade 60 is provided which includes a disc 62, formed substantially like disc 12, and a chain 64 which is formed similarily to chain 24. A pair of side plates 66, 68 is provided, one being on each side of disc 62, and these side plates have peripheral margins that extend at least partially over gullies 18, thus to overlap the anchor portions of the chain thereby preventing the influx of debris into the region of the gullies and anchor portions. and also serving to inhibit lateral shifting of the chain. Edges of the side plates underlie the side links. Side plates 66, 68 are secured to disc 62 as by welds 70, or the side plates may be secured by other suitable fasteners. Side plates 66, 68 have a thickness approximating that of chain side links 30. The addition of the side plates still provides a structure having a thickness less than the kerf formed by the cutters on chain 64. This form of the invention is particularly well suited for the harvesting of larger timber, as the side plates add additional stiffness to the cutting blade.

Figure 5:
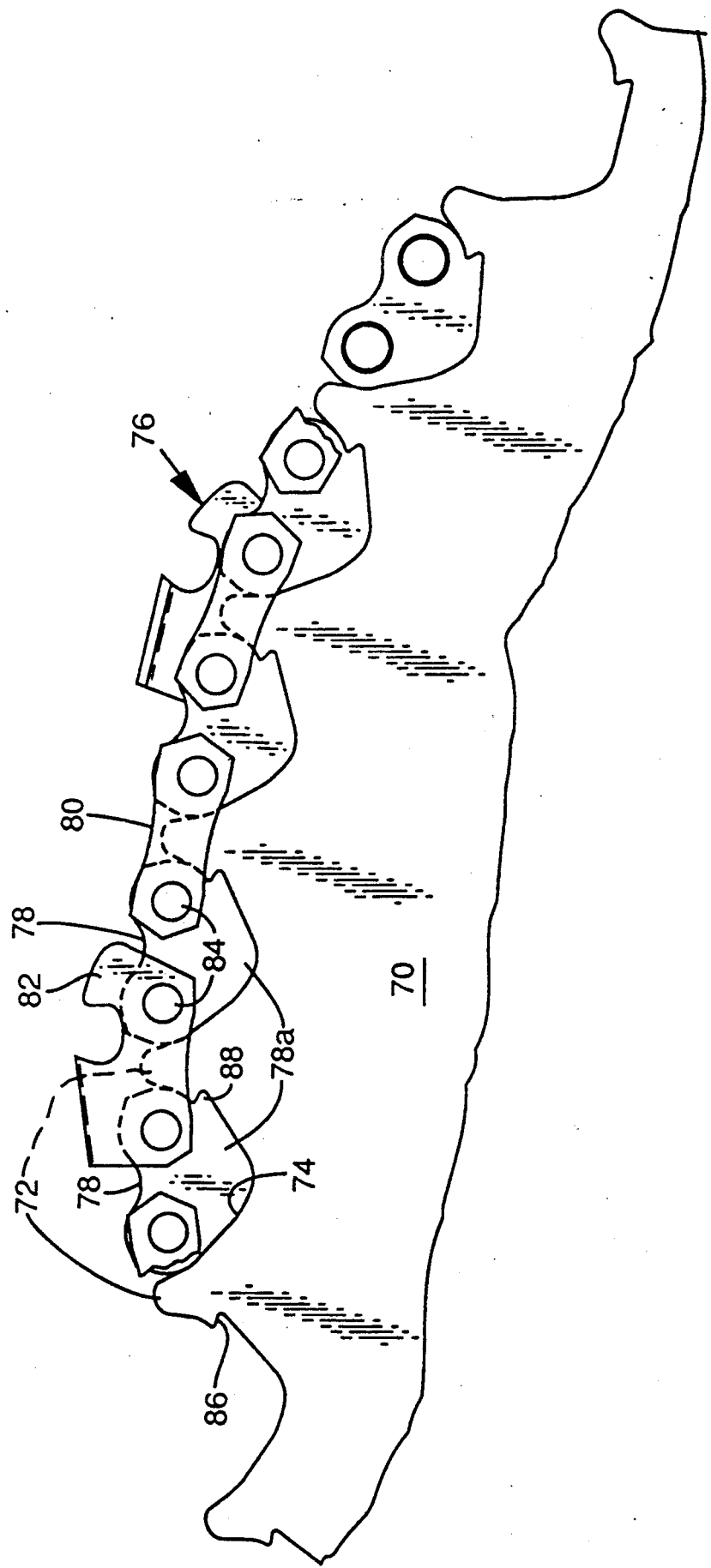
FIG. 5 is a view shown another modification of the cutting blade.

Referring to FIG. 5, the cutting blade illustrated includes a disc, partially shown at 70, which, like disc 12, has a generally circular outline, and further has an arbor-receiving bore located at the center thereof (not shown). Alternating sprocket teeth 72 and gullies 74 appear about the periphery of the disc. A cutting chain 76 is mounted about the periphery of disc 70. The chain includes center or anchor links 78 with depending anchor portions 78a, and opposed side links interconnecting these anchor links, as exemplified by the side links 80, which are tie-strap links, and side links 82, which are cutter links. Interconnecting sets of side links with a center link are pins 84.

In the cutter blade of FIG. 5, disc 70 is cut away at one side of each sprocket tooth whereby a catch portion 86 is defined in the form of a projection which projects from the tooth in a direction extending circumferentially of disc 70, or in a direction extending the length of the chain which is mounted about the disc.

Each anchor portion 78a of an anchor link is shaped to have a catch portion 88 defined at one side in the form a projection which projects outwardly from the anchor portion in the direction of the length of the chain. With the chain mounted in place, each anchor link is mounted with its anchor portion residing in a gully, and with catch portion 88 of the link underlying catch portion 86 which is part of a sprocket tooth. The structure described includes means interconnecting the anchor links and the disc preventing radially outward displacement of the anchor links. This means, more specifically, comprises interengaging catch portions on the anchor portion of a link and on a sprocket tooth, respectively.

When a cutting blade is rotated at extremely high speeds, a centrifugal force develops tending to throw the chain radially outwardly, which has the effect of stretching the chain. When a chain is manufactured, a pin 84 interconnecting the side links and a center link is placed in a position extending through accommodating bores provided in these links and then "spun" or flattened at its opposite ends, firmly to secure these ends to the side links. When a chain so constructed is subjected to tension and stretched, failure tends to occur, either by the anchor link giving way at the location of the bore which receives pin 84, or by pin 84 failing in a region where the pin extends between an anchor link and a side link. With the construction illustrated in FIG. 5, the extent of any radial outward displacement in the chain which occurs by reason of centrifugal force is limited, this in turn limiting the extent to which the chain of the cutting blade may be stretched, thus to inhibit failure in the chain.

Thus a cutting blade has been disclosed which provides for the carrying of a cutting chain on a disc which is operable to propel the chain and retain the chain thereon. The disc may be a single layer structure or may be equipped with side plates. Alternating sprocket teeth and gullies are arranged about the periphery of the disc wherein anchor portions of a cutting chain are received in the gullies and the sprocket teeth project inbetween the links in the chain.

The invention is not restricted to the particular embodiments which have been described, since variations may be made therein without departing from the scope of the invention as defined in the appended claims.

It is claimed and desired to secure as Letters Patent:

1. A circular cutting blade comprising:
a circular disc having sprocket teeth circumferentially distributed about the periphery of the disc and gullies circumferentially distributed about the periphery of the disc with the gullies interspersed between the teeth; and
a cutting chain mounted on and extending as a continuous chain circumferentially about the periphery of the disc, said chain having opposed side links interspersed with center links, the center links including links with anchor portions projecting downwardly in the chain and seated within said gullies, said side links including cutter links with cutter portions projecting radial outwardly from the disc, and a pair of side plates secured to said disc with one side plate on one side of the disc and the other side plate on the other side of the disc, the side plates having peripheral margins extending over the gullies and overlapping the anchor portions and peripheral edges underlying the side links.

2. The blade of claim 1 wherein the disc includes means for securing the disc to a power unit.

3. A circular cutting blade comprising:
   a cutting chain having successive pairs of side links distributed lengthwise along the chain interconnected by interspersed center links, the side links comprising cutter links and the center links comprising anchor links and the anchor links having anchor portions projecting downwardly in the chain; and
   a disc having alternating sprocket teeth and gullies extending about the periphery thereof, the chain being secured about the periphery of said disc with the anchor portions received in said gullies and the side links straddling the sprocket teeth, the disc having means for securing it to a powered driving unit.

4. The blade of claim 3 wherein said sprocket teeth are symmetrical.

5. The blade of claim 1 which further includes a side plate secured to said disc on each side thereof, the side plates having peripheral margins extending over the gullies and overlapping the anchor portions and peripheral edges underlying the side links.

6. The circular cutting blade of claim 3, which further includes means interconnecting at least selected anchor links and said disc inhibiting radially outward displacement of the anchor links.

7. The cutting blade of claim 6, wherein said means comprises, for an anchor link, a first catch portion on the anchor link and a second catch portion on the disc, the first and second catch portions interengaging with the anchor link received within a gully in the disc.

8. The circular cutting blade of claim 7, wherein the first catch portion is a first projection on the anchor portion of the anchor link projecting lengthwise of the chain, and the second catch portion is a second projection on a sprocket tooth in the disc which projects over said first projection.

* * * * *